United States Patent [19]
Kishner

[11] Patent Number: 5,467,191
[45] Date of Patent: Nov. 14, 1995

[54] SAMPLE POINT INTERFEROMETER FOR MEASURING CHANGES IN FIGURE OF A PRIMARY MIRROR AND PRIMARY-SECONDARY MIRROR SPACING

[75] Inventor: Stanley J. Kishner, Pomona, N.Y.

[73] Assignee: Hughes Aircraft Company, Los Angeles, Calif.

[21] Appl. No.: 246,522

[22] Filed: May 20, 1994

[51] Int. Cl.⁶ ................................... G01B 9/02
[52] U.S. Cl. ................ 356/360; 356/354; 356/358; 356/363
[58] Field of Search .................... 356/359, 360, 356/357, 358, 363, 353, 354

[56] References Cited

U.S. PATENT DOCUMENTS

| | | | |
|---|---|---|---|
| 4,022,532 | 5/1977 | Montagnino | 356/360 |
| 5,218,423 | 6/1993 | Kishner | 356/363 |
| 5,220,406 | 6/1993 | Kishner | 356/363 |

Primary Examiner—Samuel A. Turner
Attorney, Agent, or Firm—W. C. Schubert; W. K. Denson-Low

[57] ABSTRACT

Optical metrology method and apparatus for simultaneously measuring changes in figure of a primary mirror and spacing between the primary mirror (58) and a secondary mirror (54). One or more optical heads (62A, 62B, 62C) are attached to structure (66) supporting the secondary mirror (54) and adjacent thereto. Each optical head (62A, 62B, 62C) provides a laser generated output beam. By interferometry and electronics, output signals are generated which indicate the changes in figure of the primary mirror (58) and the spacing between the primary mirror (58) and the secondary mirror (54).

12 Claims, 3 Drawing Sheets

SAMPLE POINT INTERFEROMETER FOR MEASURING CHANGES IN FIGURE OF A PRIMARY MIRROR AND PRIMARY-SECONDARY MIRROR SPACING

BACKGROUND OF THE INVENTION

1. Field of the Invention

The present invention relates generally to optical metrology systems and, more particularly, to sample point interferometry methods and apparatus for measuring simultaneously changes in figure of a segmented primary mirror and spacing between primary and secondary mirrors.

2. Description of the Prior Art

Large aperture spaceborne optical systems will be needed to meet 21st century requirements for both scientific and military applications. However, conventional telescope design approaches employing large, monolithic, rigid mirrors can be excessively heavy. Furthermore, sensitivity to thermal and mechanical disturbances increases with aperture size. Active optical system approaches offer the potential of meeting these new requirements with less weight, and with the ability to actively correct for the effects of thermal and mechanical disturbances. Active system approaches include the use of segmented, and/or deformable primary mirrors, as well as secondary and tertiary mirrors that are adjustable in rigid body degrees-of-freedom.

The most general design approach for the largest system element, the primary mirror, is to segment the mirror, each segment being individually deformable by means of an array of figure control actuators. However, this design approach implies an ability to accurately and rapidly measure the primary mirror's figure so that it can be actively controlled. This entails measuring the figure of each segment as well as the relative tilt and piston (phasing) errors between segments. Alignment of secondary and tertiary mirrors requires the measurement of all rigid body degrees-of-freedom (tilt, piston, decenter and roll).

Many different figure and rigid body sensing concepts have been proposed. However, using on-board semiconductor laser diodes as a light source for multiwavelength interferometry, the sample point interferometer (SPI) has become a preferred instrument to measure figure and rigid body degrees-of-freedom simultaneously. The technique is non-contact, has a large dynamic range, and can measure at high bandwidths.

The original Sample Point Interferometer patent (Montagnino, U.S. Pat. No. 4,022,532) shows a reference beam that is local to the interferometer, whether it is located at the secondary mirror or the focal plane. This configuration can monitor the primary mirror, but laser frequency stability requirements can be very tight. The disclosure of this U.S. Patent is incorporated by reference herein in its entirety.

A more recent design that has been implemented utilizes a "remote" reference beam having a path length approximating the pathlengths of the sample beams which address the primary mirror. This configuration can reduce laser frequency stability requirements by an order of magnitude. However, this configuration is not appropriate for measuring primary/secondary mirror spacing.

In the inventor's commonly assigned U.S. Pat. No. 5,220,406, an improved system is disclosed, although it is similar in some respects to that disclosed in the aforementioned U.S. Pat. No. 4,022,532. Generally, the system includes an interferometer, a number of light reflecting spots placed at sample points on a surface to be monitored, and a source of light for generating a reference beam of collimated light and a measuring beam of collimated light. For the SPI type described therein, the light source is a laser or other source of monochromatic light. The path length of the reference beam may either be fixed, or temporally modulated. The measuring beam is directed through focussing and/or deflecting optics which defines a field that includes the reflective spots. Light reflected back through the optics from the spots is combined with the reference beam and applied to a detector that includes a plurality of light intensity detecting elements. The detector is positioned in relation to the focussing optics so that a conjugate image of the field of reflective spots is formed at the operative surface of the detector. The separate elements of the detector are positioned to detect light reflected back from the reflecting spots, combined with the reference beam light.

The configuration of the surface is monitored by comparing the relative intensities of the light derived from the sample points. When the reference beam path length is modulated, the configuration of the surface is monitored by comparing the phase relationships of the variations in the intensity of light derived from the interference of light from the sample points with light from the modulated reference beam. The system is initially set so that the intensity of signals from each of the detector elements are in a preestablished phase relation with the reference beam path length modulation. Any change thereafter in the phase relationships indicates distortion, i.e., movement forward or back from predetermined relative positions of the respective sample points. A change in phase indicates the direction and amount of distortion. This information may be utilized for applying force either manually or by an automatic system, at indicated points, so to adjust the surface to a desired configuration.

SUMMARY OF THE INVENTION

It was in light of the foregoing that the present invention was conceived and has now been reduced to practice. Unlike earlier systems, the invention has utility in any spaceborne optical system that requires monitoring of optical alignment and allows measurement of both the primary mirror and primary/secondary mirror spacing, while preserving the relaxation of laser frequency stability requirements. It provides a configuration of the sample point interferometer that accurately and rapidly monitors, simultaneously, the figure of a primary mirror, and the spacing between the primary and secondary mirrors, while minimizing the requirements on laser frequency stability. By monitoring the optical path lengths of an array of pencil beams projected to a corresponding array of reflectors affixed to the primary mirror, the SPI can provide simultaneous measurements of rigid body alignment and figure. The SPI uses one or more laser diodes as a light source for interferometry, and provides alignment and figure measurements that are repeatable, have a large dynamic range, and can be acquired at high bandwidths. All this is achieved through the use of two separate reference beams, one with a path length approximating that of the pencil beams that address the primary mirror, and one that is local to the secondary mirror and with a path length substantially shorter than the pencil beams.

Other and further features, advantages, and benefits of the invention will become apparent in the following description taken in conjunction with the following drawings. It is to be understood that the foregoing general description and the following detailed description are exemplary and explanatory but are not to be restrictive of the invention.

3

The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

Figures 1, 2:
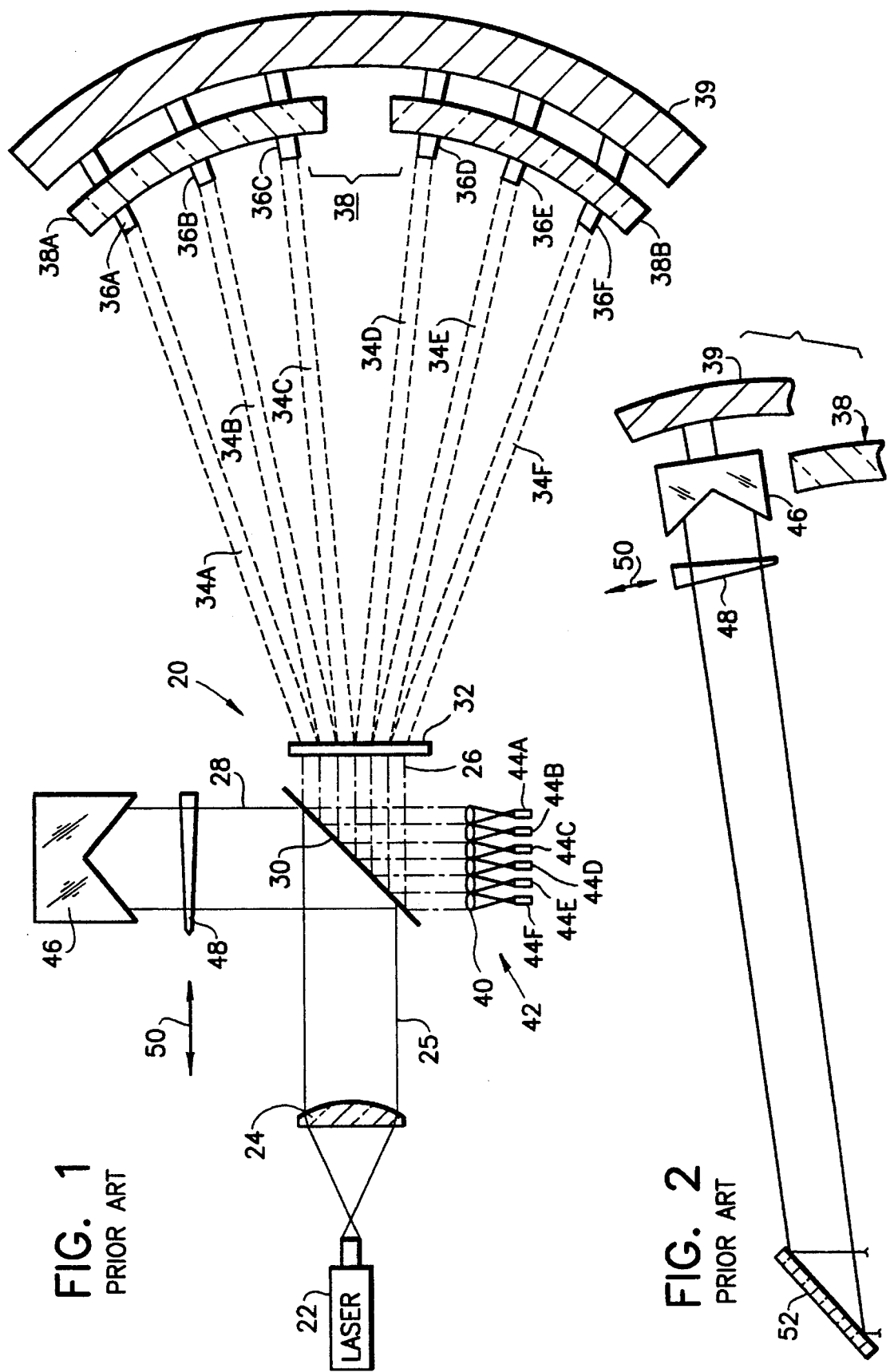
FIG. 1 is a schematic diagram of a known sample point interferometer (SPI) system.
FIG. 2 is a detail schematic diagram of a modification to FIG. 1, illustrating a more recent advance in the state of the art of the system of FIG. 1.

Turn now to the drawings and, initially to FIG. 1 which illustrates a known interferometric system 20 generally as disclosed in U.S. Pat. No. 5,220,406. In FIG. 1 an optical source includes one or more laser devices 22, such as laser diodes, that generate one or more simultaneous wavelengths. The beam from the optical source 22 is enlarged and collimated with a collimating lens 24 or equivalent apparatus. The collimated light beam 25 is separated into a measurement, or intermediate beam 26, and into a reference beam 28 with a beam splitter 30. A beam dissecting device 32, such as an array of diffraction gratings or prisms, is used to generate and deviate, simultaneously, a plurality of sample beams 34A, 34B, 34C, 34D, 34E, and 34F from the intermediate beam 26 which passes through the beam dissecting device 32. The pencil beams 38A–38F each intersect a specified reflective device 36A, 36B, 36C, 36D, 36E, 36F positioned upon a surface of a structure 38, typically comprising deformable mirror segments 38A and 38B, to be measured. The reflective devices 36A–36F return the pencil beams 34A–34F to the dissecting device 32, where the beams are again deviated such that they are mutually parallel, in a direction opposite to the original intermediate beam 26. The reflective devices are typically, mirrors, retroreflectors, or holograms.

In a typical construction many mirror segments 38A, 38B would be mounted on a rigid support structure 39.

Reflecting from the beam splitter 30, each reflected pencil beam is captured by one lenslet 40 of a lenslet array 42. The lenslet array 42 forms images of the reflective devices 36A–36F on an array of photodetectors 44A–44F. These images interfere with the reference beam 28 after the reference beam is reflected from a reference reflective device 46. The photodetectors 44A–44F are employed to determine changes in the relative distances from the beam dissecting device 32 to the reflective devices 36A–36F, from which the characteristics of the structure 38 are determinable by known methods. The reflective device 46 may be coupled to a phase modulator 48, shown diagrammatically, and the phase modulator displaced along the direction a double arrowhead 50, transverse of the reference beam 28, thereby modulating the reference beam path length and, therefore, the intensities of the interference measured by the photodectors 44. Various other means of modulating the reference

4 beam pathlength may be used, such as the introduction of moving refractive or polarizing elements or the placement of electronic or acousto-optic elements into the reference beam.

Measurement of the electrical phase of these modulated intensities is employed to determine changes in the relative distances from the dissecting device 32 to reflective devices 36A–36F. In an alternate embodiment, the source may emit two closely-spaced wavelengths, one of which is used for the plurality of sample beams and the other for the reference beam. In this alternate embodiment, the phase modulator is not required, since phase modulation occurs when the two beams of different wavelengths are combined at the detector.

The SPI configuration shown in FIG. 1, exclusive of the mirror segments 38A, 38B and surface reflective devices 36A–36F, may be referred to as an "optical head". In FIG. 1 the optical head measures all reflective devices 36A–36F simultaneously, and, therefore, also the rigid body relationship of segments 38A and 38B, and also the shape or optical figure of the segments. As such, the system of FIG. 1 may be referred to as an "integrated" system.

To be precise, the SPI system 20 of FIG. 1 includes all components shown with the exception of the structure 38, more specifically defined by the mirror segments 38A, 38B and the rigid support structure 39. In the SPI system 20, if the pathlength of a sample beam (one of beams 34A–34F) is $L_s$ and the optical pathlength of the reference beam 28 is $L_r$, then a laser wavelength drift $\Delta\lambda/\lambda$ will cause a measurement error of $\Delta\lambda/\lambda |L_s-L_r|$. That is, a fractional wavelength error of the laser device 22 causes the same fractional error in the optical path difference between sample and reference beams. For measuring the relative alignment of the mirror segments 38A, 38B, we can minimize the effects of laser wavelength drift by minimizing $|L_s-L_r|$. This is accomplished by choosing $L_r$ to be midway between the minimum and maximum sample beam paths. A practical approach which has been employed is to mount the reference reflective device in the vicinity of the structure 38. This is shown in FIG. 2. A mirror 52 is employed to turn the reference beam 28 from the beam splitter 30 and direct it to the reference retroreflective device 46 at its revised location.

Figure 3:
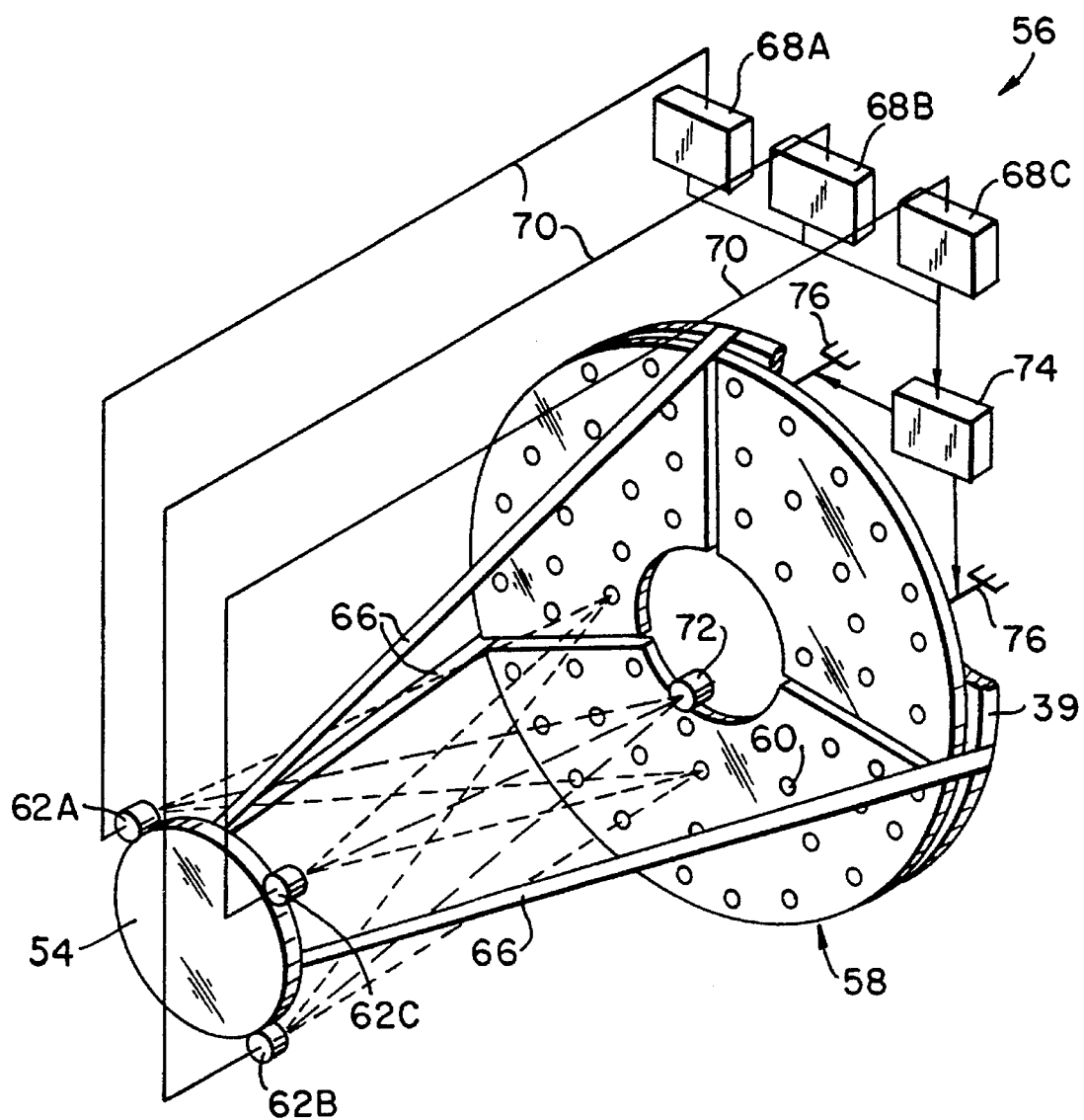
FIG. 3 is a diagrammatic illustration depicting three rigid body SPIs in a closed-loop configuration with a space-based controllably deformable segmented mirror.

Referring now to FIG. 3, there is illustrated the use of the invention in a space-based, closed-loop deformable mirror control system 56. A segmented primary mirror 58 is provided with a plurality of reflectors 60. Because of their relatively small size, and the fact that the reflectors 60 cover a very small percent of the area of the mirror 58, their effect on the imaging performance is negligible. The array of reflectors is addressed, in accordance with the invention, by a plurality of SPI optical heads 62A, 62B, and 62C. The optical heads are disposed at, for example, 120° intervals about the secondary mirror 54. In FIG. 3, the sample beams generated and received by the SPI optical heads 62 are shown as dashed lines. A tripod support structure 66 couples the secondary mirror 54 in a substantially fixed relationship to the primary mirror 58. Of course, it will be appreciated that changes in the temperature of the support structure 66 can detrimentally change the spacing between the primary and secondary mirrors.

In the embodiment shown in FIG. 3, the source and photo detector components of each of the SPI optical heads 62A, 62B, 62C is separately provided within an associated source/detector assembly 68A, 68B, 68C. Each of these assemblies is connected to its associated SPI optical head through fiber optic cables 70. A single mode fiber may be used to provide the laser illumination to the SPI optical head, and multimode fibers may be used to convey the optical signals from the SPI optical heads to the photodetectors 44A–44F and associated electronics located within the source/detector assemblies 68A, 68B, 68C. An advantage of providing the source/detector assemblies 68A, 68B, 68C at a remote location is that the size and weight of each SPI optical head is thereby reduced, which is an important consideration when mounting the SPI optical heads adjacent to a secondary mirror structure.

Further in this regard, in addition to the reflectors 60 provided on the surfaces of the segments of the primary mirror 58, a single reference reflector 72 may be mounted in the immediate vicinity of the primary mirror, such as at a position within the obscuration of the primary mirror. This differs from the embodiment shown in FIG. 1 wherein the reference reflector 46 is provided within the SPI optical head. An advantage of providing the single reference reflector 72 as shown is that reference beams projected toward this common reflector have path lengths that are much more closely matched to the plurality of sample beam path lengths. This tends to relax laser frequency stability requirements.

A further advantage of providing the reference reflector 72 at the mirror 58 is that a further reduction in the size and weight of each SPI optical head is achieved. Phase modulation of the reference beam 28 is accomplished by providing a suitable phase modulator at the reference reflector 72. For this embodiment, the SPI optical head of FIG. 1 is modified to provide a mirror 52 in the path of the reference beam for directing the reference beam to the common reference reflector 72. The SPI optical heads 62A, 62B, 62C operate as described above to separately measure the rigid body position and figure of each of the segments of the mirror 58. Based on this information, a controller 74 generates actuator commands for controlling, via mirror actuators 76, the figure of the mirror segments and their rigid body alignment.

Now consider adding the requirement to monitor spacing between the primary mirror 58 and the secondary mirror 54 in order to compensate for thermal deformations of the support structure 66 and thereby maintain focus. However, if the configuration of FIGS. 2 and 3 is used both sample and reference beams will change path length at the same rate as the spacing between primary and secondary mirrors is changed. Therefore, this configuration is inappropriate for measuring primary/secondary mirror spacing. The reference beam path length must remain constant in order for this measurement to be made. This can be achieved with a reference beam local to the optical head as shown in FIG. 1. Again, as in the instance of monitoring the figure and phasing of a segmented primary mirror as discussed above, errors in this measurement due to laser drift are $\Delta\lambda/\lambda |L_s - L_r|$. Unfortunately, the use of a reference beam located near the optical head maximizes $|L_s - L_r|$.

A proposed solution to this dilemma will now be presented. The reference reflector 72 preferably remains in the vicinity of the primary mirror 58 for all measurements of alignment of the primary mirror 58, as illustrated in FIG. 3. However, for measurement of primary/secondary mirror spacing, viewing FIG. 4, an additional interfermoter channel is provided which has a local reference reflector 78. However, up to now, only one reference beam, namely, reference beam 28, has been available in the system. However, for purposes of the invention, a second reference beam 80 is produced from that portion of the intermediate beam 26 reflected by the reflector 78. This second reference beam 80 is dedicated to measurement of spacing between the primary mirror and the secondary mirror.

Figure 4:
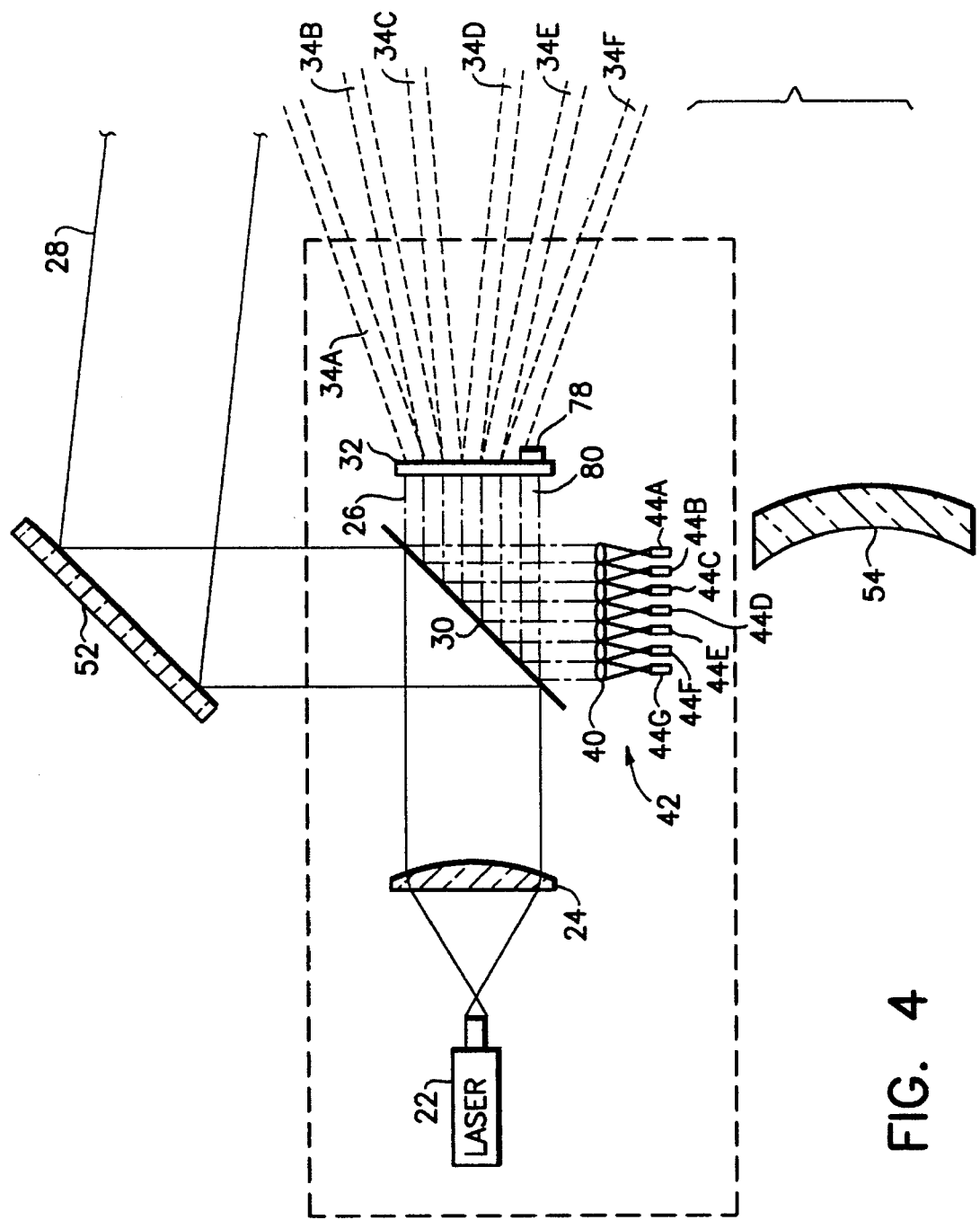
FIG. 4 is a detail schematic representation of an optical head embodying the present invention positioned adjacent, and attached to, a secondary mirror.

As indicated in FIG. 4, the illumination from the laser device 22 is divided into multiple sample beams 34A–34F by the beam dissecting device 32. The sample beams 34A–34F address the sample reflective devices 36A–36F mounted on the primary mirror 38. Customarily, there is a large number of sample beams and sample reflective devices. The second reference beam 80 is reflected back into the interferometer by the reflector 78 which is local to, and mounted on, the optical head. The reflector 78 is preferably on the beam dissecting device 32 and may be mounted on either side of that device. The sample beams 34A–34F operate normally. In this instance, the reflected reference beam 28, which now may be considered to be a first reference beam, is combined by the beamsplitter 30 with the reflected second reference beam 80. The reference beam 80 and a portion of reference beam 28 are captured by one of the lenslets 40 of the lenslet array 42 to form overlapping images on a photodetector 44G. Interference between these images results in an output signal which indicates changes in the spacing between the primary mirror 38A, 38B and the secondary mirror 54.

Laser wavelength drift, however, affects beams or channels 34A–34F differently than second reference beam 80. For example, if the primary/secondary mirror spacing is 10 m, the system could exhibit the following dimensions:

| Channels 34A–34F: | $L_r = 10$ m |
| --- | --- |
| | $(L_s)_{max} = 10.5$ m |
| | $(L_s)_{min} = 9.5$ m |
| | $(L_r - L_s)_{max} = 0.5$ m |
| | $\Delta OPD$ error $= \Delta\lambda/\lambda$ (0.5 m) |
| | For $\Delta\lambda/\lambda = 10^{-8}$, $\Delta OPD = 5$ nm |
| Channel 80: | $L_r = 10$ m |
| | $L_s = \phi$ m |
| | $\Delta OPD$ error $= \Delta\lambda/\lambda$ (10 m) |
| | For $\Delta\lambda/\lambda = 10^{-8}$, $\Delta OPD = 100$ nm |
| where: | $L_r$ = optical path length, reference beam |
| | $L_s$ = optical path length, sample beam |
| | OPD = optical path difference |
| | $\lambda$ = wave length, light from laser 22 |

A relative wavelength stability of $\Delta\lambda/\lambda \leq 10^{-8}$ is readily achievable with gas lasers, and is achievable with semiconductor laser diodes if active means of stabilization are used, such as temperature control or comparison with an external wavelength reference. The resulting 5 nm stability for figure measurements is typical of requirements for segmented optical systems. For example, a visible telescope with a mean wavelength of 500 nm and a wavefront quality of $\lambda/10$ will be degraded by $\lambda/100$ if OPD measurements are in error by 5 nm. Significantly larger wavefront errors from laser wavelength stabilization errors are not usually tolerable because they do not allow for other inevitable wavefront errors due to non-ideal figure, segment alignment errors, and secondary mirror alignment errors.

The 100 nm error in primary/secondary mirror separation is also a typical tolerance for a large, visible, segmented telescope.

While preferred embodiments of the invention have been disclosed in detail, it should be understood by those skilled in the art that various other modifications may be made to the illustrated embodiments without departing from the scope of the invention as described in the specification and defined in the appended claims.

I claim:

1. Optical metrology apparatus for simultaneously measuring changes in figure of a primary mirror and spacing between the primary mirror and a secondary mirror comprising:

optical head means attached to structure supporting the secondary mirror and adjacent thereto including:

a source of radiation providing an output beam;

means for producing from the output beam first and second reference beams and a plurality of sample beams, said producing means providing the first reference beam to a first reference beam optical path and providing the second reference beam to a second reference beam optical path and providing the plurality of sample beams to a plurality of sample beam optical paths, reflecting means on the primary mirror being disposed in the optical path for the first reference beam and reflecting the first reference beam, reflecting means on the primary mirror being disposed in the paths of the plurality of the sample beams and reflecting the plurality of sample beams, reflecting means on said optical head means being disposed in the optical path of the second reference beam and reflecting the second reference beam before reaching the primary mirror, the optical path for the first reference beam being substantially similar in length to the optical paths for the plurality of the sample beams, the optical path for the second reference beam being substantially shorter than that of the first reference beam;

said producing means subsequently operable for combining the reflected first reference beam with each of the reflected sample beams into a plurality of combined beams;

detector means disposed for receiving the plurality of combined beams and having a plurality of outputs for providing a plurality of signals that indicate an intensity of each of the plurality of the combined beams;

comparing means for comparing the magnitude and/or phase of the plurality of signals and providing an output which is a function of the changes in figure of the primary mirror;

means for combining the reflected first reference beam with the reflected second reference beam into a combined beam;

detector means disposed for receiving the combined beam and having an output providing a signal that indicates a time varying intensity of the combined beam;

comparing means for comparing the magnitude and/or phase of the signal and providing an output which is a function of the changes in spacing between the primary mirror and the secondary mirror.

2. Optical metrology apparatus as set forth in claim 1 including:

means disposed in the path of the first reference beam for modulating the optical phase of the first reference beam.

3. Optical metrology apparatus as set forth in claim wherein said modulating means includes means for imposing a time varying optical path length on the first reference beam.

4. Optical metrology apparatus as set forth in claim 2 wherein said modulating means includes an optical wedge for oscillating transversely of the first reference beam and thereby imposing a time varying optical path length on the first reference beam.

5. Optical metrology apparatus as set forth in claim 1 wherein said source of radiation includes a laser device and a collimating optic aligned therewith and intermediate said laser device and said producing means.

6. Optical metrology apparatus as set forth in claim 5 wherein said laser device includes a semiconductor laser diode.

7. Optical metrology apparatus as set forth in claim 1 wherein said beam producing means includes:

a beam splitter intermediate said source of radiation and the primary mirror for creating the first reference beam and an intermediate beam; and a beam dissecting means intermediate said beam splitter and the primary mirror for providing the plurality of sample beams and the second reference beam from the intermediate beam.

8. A method of performing optical metrology so as to simultaneously measure changes in figure of a primary mirror and spacing between the primary mirror and a secondary mirror, said method comprising the steps of:

providing a source of radiation having an output beam adjacent the secondary mirror and attached to the structure thereof;

producing from the output beam first and second reference beams and a plurality of sample beams, the step of producing including the steps of providing the first reference beam to a first reference beam optical path and providing the second reference beam to a second reference beam optical path and providing the plurality of sample beams to a plurality of sample beam optical paths, disposing reflecting means on the primary mirror in the first reference beam optical path and reflecting the first reference beam, disposing reflecting means on the primary mirror in the paths of the plurality of the sample beams and reflecting the plurality of sample beams, disposing reflecting means in the second reference beam optical path intermediate the source of radiation and the primary mirror and reflecting the second reference beam before it reaches the primary mirror, the optical path for the first reference beam being substantially similar in length to the optical paths for the plurality of the sample beams, the optical path for the second reference beam being substantially shorter than that of the first reference beam;

combining the reflected first reference beam with each of the reflected sample beams into a plurality of combined beams;

detecting the plurality of combined beams and providing a plurality of signals that indicate a time varying intensity of each of the combined beams;

comparing the magnitude and/or phase of the plurality of signals;

providing an output which is a function of changes in the figure of the primary mirror;

combining the reflected first reference beam with the reflected second reference beam into a combined beam;

detecting the combined beam and providing a signal that indicates an intensity of the combined beam;

comparing the magnitude and/or phase of the signal; and providing an output which is a function of changes in the spacing between the primary mirror and the secondary mirror.

9. A method of performing optical metrology as set forth in claim 8 including the step of:

modulating the optical phase of the first reference beam.

10. A method of performing optical metrology as set forth in claim 9
wherein the step of modulating includes a step of imposing a time varying optical path length on the first reference beam.

11. A method of performing optical metrology as set forth in claim 9
wherein the step of modulating includes a step of oscillating an optical wedge transversely of the first reference beam and thereby imposing a time varying optical path length on the first reference beam.

12. A method of performing optical metrology as set forth in claim 8
wherein the step of producing includes the steps of:

splitting the beam from the source of radiation intermediate the source of radiation and the primary mirror for creating the first reference beam and an intermediate beam; and dissecting the intermediate beam to produce therefrom the plurality of sample beams and the second reference beam.

\* \* \* \* \*